United States Patent
Okada (10) Patent No.: US 11,050,929 B2
(45) Date of Patent: Jun. 29, 2021

(54) DRIVER RECORDER, DISPLAY CONTROL METHOD AND PROGRAM

(71) Applicant: JVCKENWOOD Corporation, Yokohama (JP)

(72) Inventor: Yoshinobu Okada, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/020,900

(22) Filed: Sep. 15, 2020

(65) Prior Publication Data

US 2020/0412944 A1 Dec. 31, 2020

Related U.S. Application Data

(63) Continuation of application No. PCT/JP2019/004421, filed on Feb. 7, 2019.

(30) Foreign Application Priority Data

Mar. 15, 2018 (JP) .............................. JP2018-047568

(51) Int. Cl.
*H04N 5/232* (2006.01)
*G06T 7/70* (2017.01)
(Continued)

(52) U.S. Cl.
CPC ......... *H04N 5/23229* (2013.01); *B60Q 9/008* (2013.01); *B60R 1/00* (2013.01);
(Continued)

(58) Field of Classification Search
CPC ....... B60Q 9/008; B60R 1/00; B60R 2300/10; B60R 2300/20; B60R 2300/8006;
(Continued)

(56) References Cited

U.S. PATENT DOCUMENTS

| 2004/0085448 | A1* | 5/2004 | Goto | ....................... G01S 17/04 |
| | | | | 348/148 |
| 2010/0014711 | A1* | 1/2010 | Camhi | ..................... B60Q 3/80 |
| | | | | 382/104 |
| 2011/0090073 | A1* | 4/2011 | Ozaki | ....................... B60R 1/00 |
| | | | | 340/435 |

FOREIGN PATENT DOCUMENTS

| JP | 2012-228931 A | 11/2012 |
| JP | 2018-121104 A | 8/2018 |
| JP | 2018-196066 A | 12/2018 |

OTHER PUBLICATIONS

International Preliminary Report on Patentability dated Sep. 15, 2020 and Written Opinion dated Apr. 23, 2019, 13 pgs.
(Continued)

*Primary Examiner* — Nathnael Aynalem
(74) *Attorney, Agent, or Firm* — Brundidge & Stanger, P.C.

(57) ABSTRACT

A drive recorder includes: an image acquisition interface that acquires image data captured by a camera mounted to a vehicle; an imaging controller that causes the camera to capture a first image, in which a first imaging condition is used, and a second image, in which a second imaging condition is used, in temporally different frames; an image recorder that records moving image data based on the first image; a passenger detector that detects a passenger in the vehicle; an image processor that generates, based on the second image including the passenger detected by the passenger detector, a passenger image in which visibility of an image portion including the passenger is higher than in the second image; and a display controller that causes the display device to display moving images based on the passenger image.

8 Claims, 4 Drawing Sheets

(51) Int. Cl.
*B60Q 9/00* (2006.01)
*B60R 1/00* (2006.01)
*G06K 9/00* (2006.01)
*H04N 5/225* (2006.01)
*H04N 5/445* (2011.01)
*H04N 5/76* (2006.01)
*H04N 7/18* (2006.01)
*H04N 9/73* (2006.01)

(52) U.S. Cl.
CPC ..... *G06K 9/00369* (2013.01); *G06K 9/00791* (2013.01); *G06K 9/00838* (2013.01); *G06T 7/70* (2017.01); *H04N 5/2253* (2013.01); *H04N 5/445* (2013.01); *H04N 5/76* (2013.01); *H04N 7/18* (2013.01); *B60R 2300/10* (2013.01); *B60R 2300/20* (2013.01); *B60R 2300/8006* (2013.01); *G06T 2207/30196* (2013.01); *G06T 2207/30268* (2013.01); *H04N 9/735* (2013.01)

(58) Field of Classification Search
CPC ........ B60R 2300/8013; B60R 2300/80; B60R 2300/301; B60R 2300/302; G06K 9/00838; G06K 9/00845; G06K 9/00832; G06T 2207/30268; G06T 7/70; G06T 7/73; G06T 7/74
USPC .......................................................... 348/148
See application file for complete search history.

(56) References Cited

OTHER PUBLICATIONS

International Search Report from International Application No. PCT/JP2019/004421 dated Apr. 23, 2019, 2 pages.

* cited by examiner

DRIVER RECORDER, DISPLAY CONTROL METHOD AND PROGRAM

CROSS REFERENCE TO RELATED APPLICATION

Priority is claimed to Japanese Patent Application No. 2018-047568, filed on Mar. 15, 2018 and PCT International Patent Application No. PCT/JP2019/004421, filed on Feb. 7, 2019, the entire contents of which are incorporated herein by reference.

BACKGROUND OF THE INVENTION

1. Field of the Invention

The present invention relates to a drive recorder, a display control method, and a program.

2. Description of the Related Art

In recent years, drive recorders for capturing and recording images in front of a traveling vehicle have been popularly used. In addition to an image outside the vehicle such as an image lateral to or behind the vehicle, a drive recorder may capture an image inside the vehicle. For example, a camera for capturing an image of a back seat that is not easily visible from the driver who is driving the vehicle may be provided, and an image of a child in the back seat may be displayed on a display device provided at a position that is easy for the driver to see. There is also known a device for capturing images both inside and outside the vehicle by using a single wide-angle camera (see, for example, patent literature 1).

[Patent Literature 1] JP2012-228931

SUMMARY OF THE INVENTION

In the case a single camera is used to image a plurality of areas such as the spaces inside and outside a vehicle, the optimum value of an imaging condition such as exposure and white balance may vary from area to area. In that case, it would be difficult to imaging all of the plurality of areas properly.

The disclosure addresses the above-described issue, and a general purpose thereof is to provide a technology for imaging a plurality of areas properly by using a single camera.

A drive recorder according to an embodiment of the present invention includes: an image acquisition interface that acquires image data captured by a camera mounted to a vehicle; an imaging condition determiner that determines a first imaging condition related to at least one of exposure, color, and brightness of the camera with reference to a first image area in the image data acquired by the image acquisition interface and determines a second imaging condition related to at least one of exposure, color, and brightness of the camera with reference to a second image area different from the first image area in the image data acquired by the image acquisition interface; an imaging controller that causes the camera to capture a first image, in which the first imaging condition is used, and a second image, in which the second imaging condition is used, in temporally different frames; an image recorder that records moving image data based on the first image; a passenger detector that detects a passenger in the vehicle; an image processor that generates, based on the second image including a passenger detected by the passenger detector, a passenger image in which visibility of an image area including the passenger is higher than in the second image; and a display controller that causes the display device to display moving images based on the passenger image.

Another embodiment of the present invention relates to a display control method. The method includes: acquiring image data captured by a camera mounted to a vehicle; determining a first imaging condition related to at least one of exposure, color, and brightness of the camera with reference to a first image area in the image data acquired and determining a second imaging condition related to at least one of exposure, color, and brightness of the camera with reference to a second image area different from the first image area in the image data acquired; causing the camera to capture a first image, in which the first imaging condition is used, and a second image, in which the second imaging condition is used, in temporally different frames; recording moving image data based on the first image; detecting a passenger in the vehicle; generating, based on the second image including the passenger detected, a passenger image in which visibility of an image portion including the passenger is higher than in the second image; and causing the display device to display moving images based on the passenger image.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially the identical function and configuration are represented by the same reference symbols, and the description is not duplicated. Elements not directly relevant to the invention are omitted from the illustration.

Figure 1:
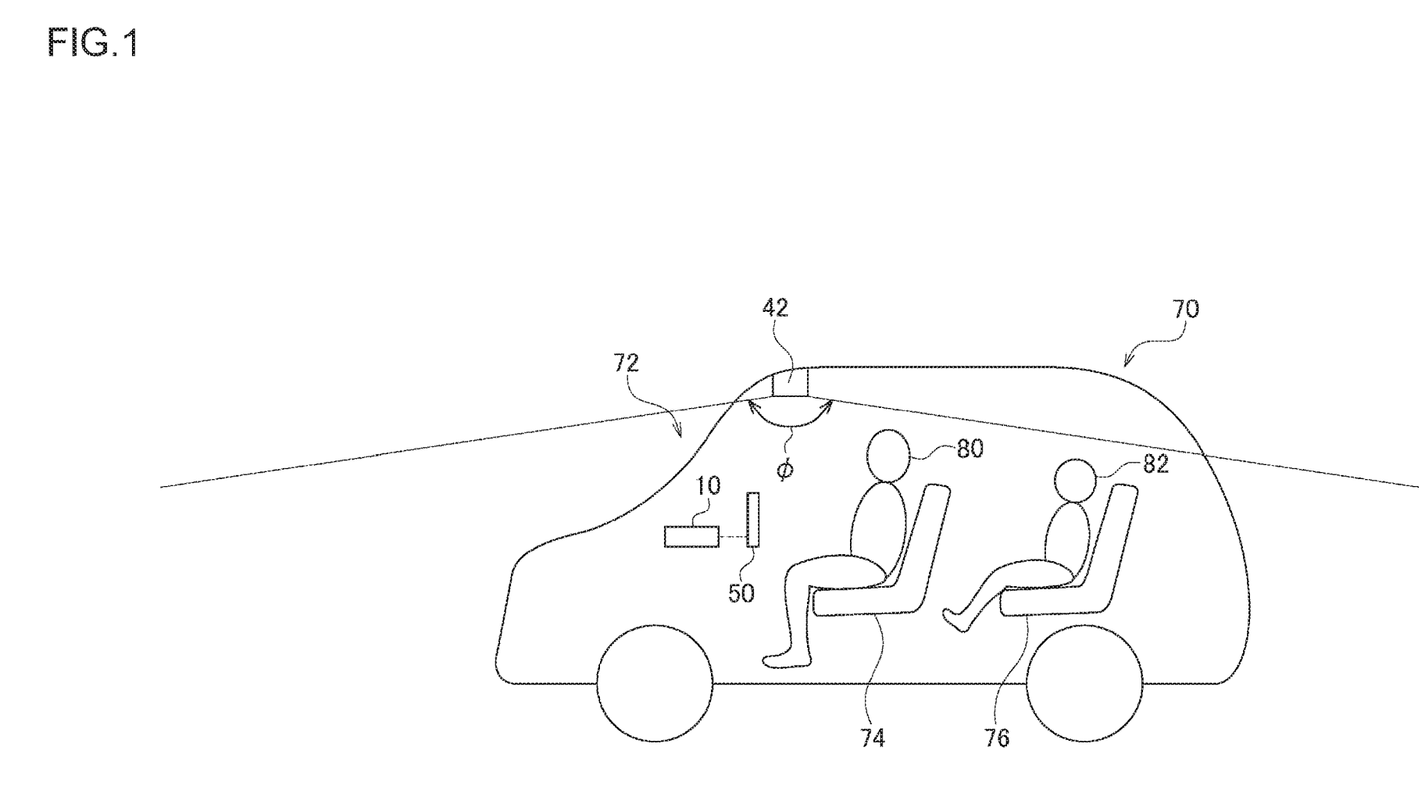
FIG. 1 schematically shows a vehicle in which a drive recorder according to an embodiment is mounted.

FIG. 1 schematically shows a vehicle 70 in which a drive recorder 10 according to an embodiment is mounted. The drive recorder 10 acquires image data from a camera 42 for capturing images both inside and outside the vehicle 70 and records the image data. The drive recorder 10 causes a display device 50 to display the image as necessary. The camera 42 is a super-wide angle camera having a field angle φ of about 150°-180°. The camera 42 captures an image in front of the vehicle across a windshield 72 of the vehicle 70 and captures an image of a driver 80 seated in a front seat 74 of the vehicle 70 or an image of a passenger 82 seated in a back seat 76. The position of mounting of the camera 42 is not limited to any particular position. For example, the camera 42 can be mounted at a position of a rear view mirror of the vehicle 70.

Figure 2:
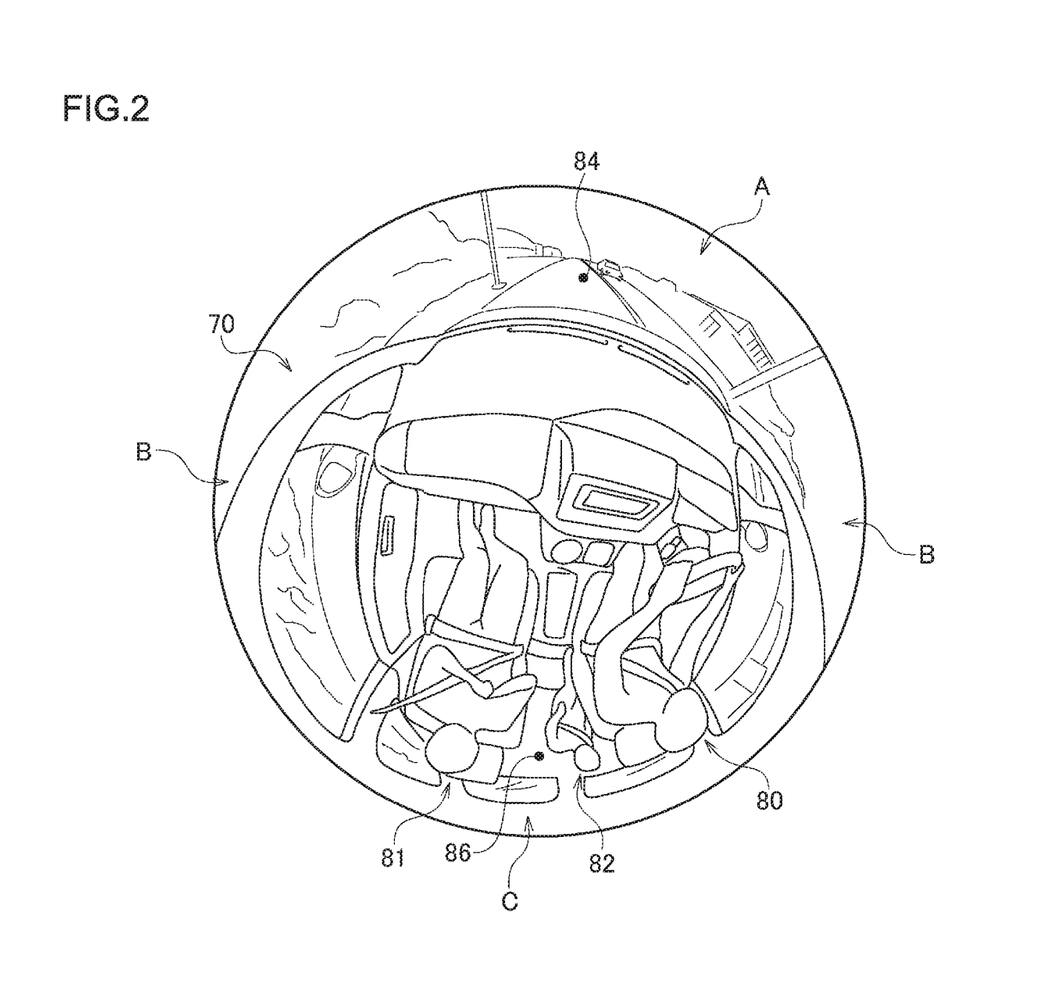
FIG. 2 shows an example of an image captured by the camera.

FIG. 2 shows an example of an image captured by the camera 42. In the illustrated example, the scene in all directions around the camera 42 are captured in an image. A frontward area A, a lateral area B, and a rearward area C of the camera 42 are included in the image captured. The frontward area A includes a road that the vehicle 70 is traveling on, an oncoming vehicle, etc. The lateral area B includes a window frame, a scenery viewed across a window to the left or right of the vehicle 70. The rearward area C includes the driver 80 seated in the driver's seat, a passenger 81 seated in the front passenger seat, a passenger 82 seated in the back seat, etc. By capturing an image as illustrated by using the camera 42, it is possible to monitor the spaces inside and outside the vehicle 70 in a single image.

The camera 42 is not limited to the one for capturing a super-wide angle image such as the image shown in FIG. 2. Any camera having an imaging range that covers both the spaces inside and outside the vehicle 70 serves the purpose. For example, the camera may be provided to capture an image inside the vehicle 70 and an image behind the vehicle 70. More specifically, the camera may be provided to capture an image behind the vehicle from the position of the rear view mirror of the vehicle 70. Alternatively, the camera may be provided behind the front seat 74 or on the ceiling above the back seat 76 so that both the back seat 76 and the scene behind the vehicle are captured by the camera.

In actual usage conditions, it is not easy to image all of the frontward area A, the lateral area B, and the rearward area C of FIG. 2 clearly. This is because the brightness or white balance in the areas may vary significantly, making it impossible to determine a single imaging condition that is suitable to all areas. During daylight on a fine day, for example, the frontward area A is bright, but the rearward area C is dark. If an imaging condition such as exposure and white balance that represents an average of the imaging areas as a whole is applied in this situation, the frontward area A will be whitened as a whole, and the rearward area C will be darkened as a whole. Both images will fail to show the scene in a manner easy to recognize. It would also be difficult to acquire an image showing the whole imaging area in a highly visible manner even in a situation in which the room lamp is lighted at night or in a situation in which a part of the interior is illuminated by the headlight of an oncoming vehicle.

This is addressed by this embodiment by capturing images both inside and outside the vehicle in temporally different frames for capturing moving images, applying different imaging conditions to the images. More specifically, the first image, in which is used the first imaging condition defined with reference to an image area that captures a scene outside the vehicle, and the second image in which is used the second imaging condition defined with reference to an image area that captures a scene inside the vehicle, are captured in different frames. Further, by creating moving images based on the first image and moving images based on the second image separately, moving images showing the scene outside the vehicle in a highly visible manner and moving images showing the scene inside the vehicle in a highly visible manner can be provided respectively. Further, by detecting a passenger in the vehicle and using the second imaging condition optimized at the position of the passenger detected, moving images suitable for monitoring the passenger can be provided. For example, clear moving images capturing the child seated in the back seat can be provided.

Figure 3:
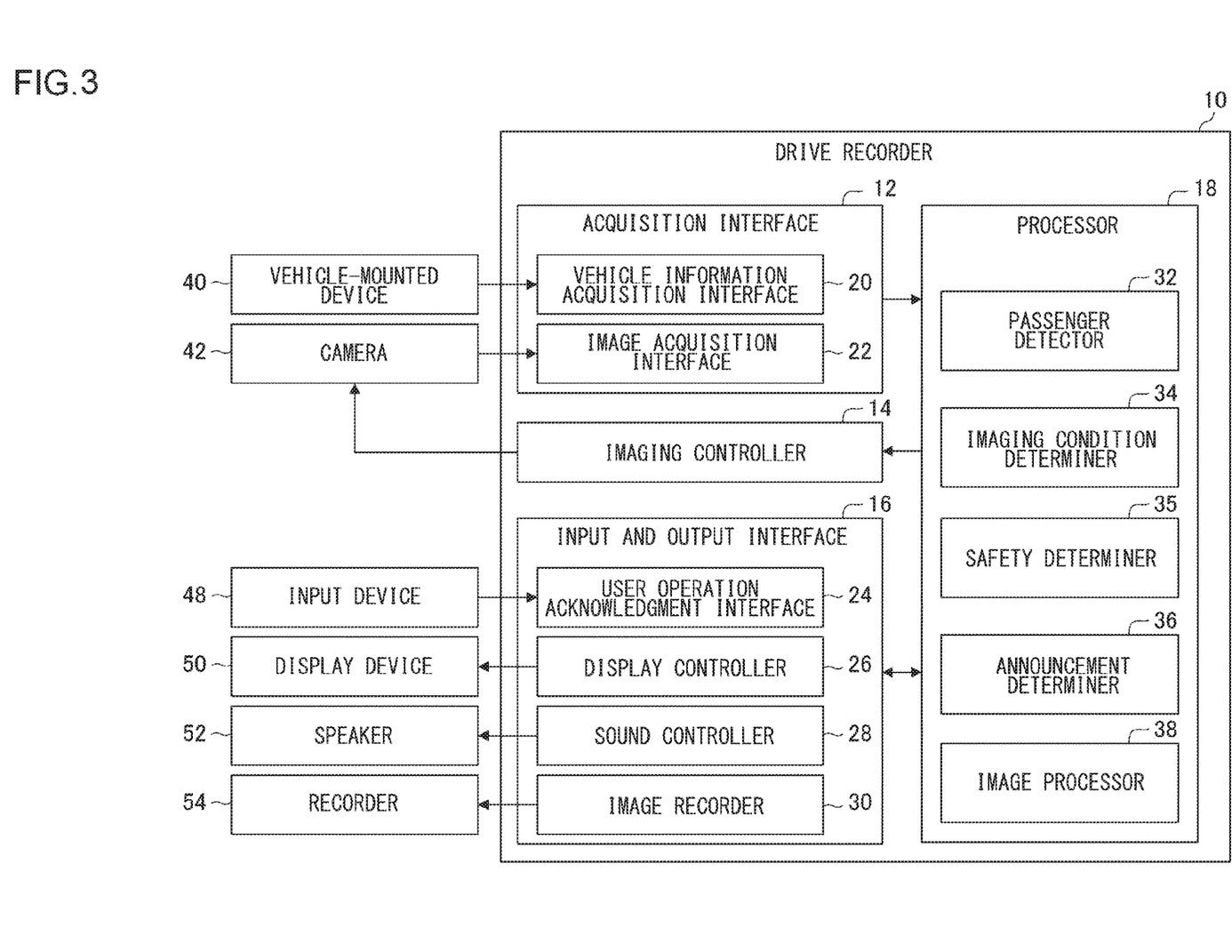
FIG. 3 is a block diagram schematically showing the functions and configuration of the drive recorder.

FIG. 3 is a block diagram schematically showing the functions and configuration of the drive recorder 10. The functional blocks depicted are implemented in hardware such as devices and mechanical apparatus exemplified by a CPU and a memory of a computer, and in software such as a computer program. FIG. 3 depicts functional blocks implemented by the cooperation of these elements. Therefore, it will be understood by those skilled in the art that these functional blocks may be implemented in a variety of manners by a combination of hardware and software.

The drive recorder 10 includes an acquisition interface 12, an imaging controller 14, an input and output interface 16, and a processor 18. The acquisition interface 12 includes a vehicle information acquisition interface 20 and an image acquisition interface 22. The input and output interface 16 includes a user operation acknowledgment interface 24, a display controller 26, a sound controller 28, and an image recorder 30. The processor 18 includes a passenger detector 32, an imaging condition determiner 34, a safety determiner 35, an announcement determiner 36, and an image processor 38.

The vehicle information acquisition interface 20 acquires information related to the vehicle 70 and information related to a situation around the vehicle 70 from a vehicle-mounted device 40. Specific examples of the vehicle-mounted device 40 include, but are not limited to, a vehicle speed sensor, a steering angle sensor, an acceleration sensor, a vehicle-mounted camera, a radar sensor, a positional information sensor (GPS sensor), a navigation device, a seating sensor, etc. The vehicle information acquisition interface 20 may acquire these items of information via a controller area network (CAN) of the vehicle 70. The image acquisition interface 42 acquires image data captured by the camera 42 mentioned above.

The imaging controller 14 controls the operation of the camera 42. The imaging controller 14 causes the camera 42 to capture an image in accordance with the imaging condition determined by the imaging condition determiner 34. The imaging controller 14 causes the camera 42 to capture the first image, in which the first imaging condition is used, and the second image, in which the second imaging condition is used, in temporally different frames for capturing moving images. The imaging controller 14 may cause the camera 42 to capture the first image and the second image alternately. For example, the first image is captured in odd-numbered frames, and the second image is captured in even-numbered frames. Preferably, the camera 42 is a high frame rate camera. For example, both the first image and the second image can be captured at 30 fps (frames per second) by using a 60 fps camera.

The user operation acknowledgment interface 24 receives a user operation input from the input device 48. The display controller 26 causes the display device 50 to display the image generated by the image processor 38. In the illustrated example, the display device 50 is a display device such as a liquid crystal display and is mounted at the position of the center console or the dashboard of the vehicle 70. The display device 50 may be mounted at the position of the camera 42. The input device 48 is a so-called touch-sensitive panel sensor and is provided in the display area of the display device 50. Alternatively, the input device 48 may not be a touch-sensitive type and may be comprised of a button, etc. provided around the display device 50.

The sound controller 28 outputs sound determined by the announcement determined by the announcement determiner 36 to the speaker 52. For example, the sound controller 28 outputs announcement sound for calling for attention to vehicle driving to the speaker 52. The image recorder 30 causes a recorder 54 to record image data acquired by the image acquisition interface 22 or image data generated by processing the acquired image data. The recorder 54 is exemplified by a flash memory or a hard disk. The recorder 54 may be provided in an external device such as a smartphone and a tablet connected by wireless communication such as Wi-Fi (registered trademark).

The passenger detector 32 detects a passenger on board the vehicle 70 based on the information acquired by the acquisition interface 12. For example, the passenger detector 32 detects a passenger based on the information from the seating sensor acquired by the vehicle information acquisition interface 20. For example, the passenger detector 32 detects whether or not a passenger is seated in the back seat of the vehicle 70. When a passenger is seated in the back seat, the passenger detector 32 detects the seating position of the passenger (e.g., leftward, center, rightward). The passenger detector 32 may detect whether or not a passenger is seated and the seating position of the passenger based on the image data acquired by the image acquisition interface 22. The type and position of passenger subject to detection by the passenger detector 32 may be designated by the user by way of a user operation in the input device 48. For example, a particular seat such as a child seat may be designated as being subject to detection. Babies and toddlers may be designated as being subject to detection. Animals like dogs and cats that are kept as pets may be subject to detection. The term "passenger" in this embodiment may be a concept that covers both humans and animals. Optionally, objects such as valuable goods carried on the vehicle 70 may be subject to detection.

The imaging condition determiner 34 determines an imaging condition of the camera 42 based on the image data acquired by the image acquisition interface 22. The imaging condition determiner 34 defines a reference point or a reference area on an image captured by the camera 42 and determines an imaging condition so that the condition such as exposure and color at the reference point or in the reference area is optimized. The imaging condition determiner 34 determines the first imaging condition with reference to a position in the image that captures a scene outside the vehicle and determines the second imaging condition with reference to a position in the image that captures a scene inside the vehicle. For example, the imaging condition determiner 34 defines a first reference point 84 in a frontward area A in the image shown in FIG. 2 and determines the first imaging condition so as to optimize the brightness and chromaticity at the first reference point 84. Further, the imaging condition determiner 34 defines a second reference point 86 in the rearward area C in the image shown in FIG. 2 and determines the second imaging condition so as to optimize the brightness and chromaticity at the second reference point 86. The imaging condition determiner 34 determines the first imaging condition and the second imaging condition so that feedback control is realized that inhibits abrupt change in brightness and chromaticity at the reference point or in the reference area in the images captured under the respective imaging conditions. The imaging condition determiner 34 may define the second imaging condition by defining the second reference point at the position of the passenger detected by the passenger detector 32. For example, the imaging condition determiner 34 may define the second reference point at the position of the passenger 82 of FIG. 2. The term "imaging condition" according to this embodiment encompasses both determination of a shutter speed and aperture value for defining an exposure condition and determination of an image processing method such as auto gain control (AGC) and auto white balance control (AWC) for compensating the brightness and color of the captured image.

The safety determiner 35 determines the level of safety of vehicle travel based on the information acquired by the acquisition interface 12. The safety determiner 35 determines the level of safety based on i) the speed, steering angle, acceleration of the vehicle 70, ii) whether an obstacle such as another vehicle or a structure is located around the vehicle, iii) the distance to the obstacle, iv) the position of the driver's vehicle relative to the driving lane, v) the attribute of the road that the vehicle is traveling on, etc. The safety determiner 35 determines the safety in three levels. Level 1 represents a state considered to be "safe" and corresponds to, for example, a situation in which the vehicle is waiting for a traffic light at an intersection or a situation in which the vehicle is traveling on a straight road such as a highway and a trunk road and there are no obstacles around. Level 2 represents a state considered to be a "caution needed" state and corresponds to a situation in which the vehicle is traveling on a curved road or near an intersection, or a situation in which the likelihood of collision is low but there is another vehicle around. Level 3 represents a state considered to be an "alarm needed" state and corresponds to a situation in which another vehicle is near enough to warrant prediction of a possible collision or a situation in which the driver's vehicle deviates significantly from the driving lane that the vehicle is traveling on. Determination on the safety may not be made in three levels and may be made in two levels including "normal" and "caution". For example, in addition to the situation of level 1 mentioned above, a determination of "normal" may be made when the vehicle is traveling at a normal speed such as when the vehicle is traveling on a local street within a speed limit. Alternatively, determination may be made in four or more levels.

The safety determiner 35 may determine the safety by acquiring information on the traveling speed or acceleration of the vehicle or information on manipulation of the accelerator, brake, steering wheel, etc. from the vehicle. Alternatively, the safety determiner 35 may determine the safety by acquiring information on the surroundings such as the road width of the road that the vehicle is traveling on, traffic jam information, and brightness around the vehicle from a sensor or a navigation system provided in the vehicle. The safety determiner 35 may determine the safety by using information acquired from an external device outside the vehicle by way of wireless communication, etc. The safety level may be determined in accordance with whether the driving assistance function such as adaptive cruise control (ACC) or lane keeping assistance system (LKAS) is in operation. The safety level may be determined to be relatively high when the driving assistance function is in operation.

The announcement determiner 36 determines an announcement for calling for attention to vehicle driving in accordance with the level of safety determined by the safety determiner 35. When the safety determiner 35 determines that the safety level is such that an alert to the drive is necessary (e.g., level 3), the announcement determiner 36 determines an announcement that should be made to the driver. For example, when the distance to an obstacle ahead of the driver's vehicle is equal to smaller than a reference value determined by the vehicle speed, the announcement determiner 36 determines to announce "warning collision ahead". When the quantity of deviation of the position of the driver's vehicle relative to the driving lane exceeds a reference value, the announcement determiner 36 determines to announce "deviation from driving lane". When the traveling speed of the vehicle exceeds a speed limit, the announcement determiner 36 may determine to announce "warning violation of speed limit". In the event of sudden start, sudden braking, sudden steering, the announcement determiner 36 may determine to announce "warning on vehicle behavior". When the announcement determiner 36 determines an announcement, the announcement determiner 36 causes the display device 50 to display an announcement image (alert image) and causes the speaker 52 to output announcement sound. An image symbolizing a sign indicating danger may be used as the announcement image. For example, an image showing a character or a mark "!" in a yellow background or an image showing a character "danger", "caution ahead", etc. may be used. Buzzer sound, alarm sound, etc. may be used as the announcement sound. Voice that reads a message like "please proceed with caution", "please slow down", etc. may be used. The display size of the announcement image or the sound volume of the announcement sound may be changed in accordance with the safety level determined or the announcement determined.

The image processor 38 generates an image that should be displayed on the display device 50 or image data that should be recorded in the image recorder 54, based on the information acquired by the acquisition interface 12. The image processor 38 organizes the image data acquired by the image acquisition interface 22 according to the imaging condition and generates different sets of moving image data. The image processor 38 generates the first moving image data by using only the frames of the first images captured by using the first imaging condition and generates the second moving image data by using only the frames of the second images captured by using the second imaging condition. The first moving image data thus generated is recorded in the recorder 54 as moving image data for the drive recorder. The second moving image data may also be recorded in the recorder 54 aside from the first moving image data.

When the passenger detector 32 detects a passenger, the image processor 38 generates a passenger image based on the second image captured by using the second imaging condition. The term "passenger image" means an image for showing a passenger clearly and an image processed to result in a display mode in which the visibility of an image area including the passenger is higher than in the original second image. The image processor 38 generates a passenger image by transforming a polar coordinate image shown in FIG. 2 into a Cartesian image, extracting and enlarging a partial region in the second image that includes the passenger, or adjusting the brightness or chromaticity of the image. The passenger image thus generated is displayed on the display device 50 in the form of moving images for monitoring the passenger. In the case a baby or a toddler, a child, a sick person, etc. is seated in the back seat, for example, the driver can know how the passenger is doing easily. When the passenger detector 32 does not detect a passenger, the image processor 38 may not generate a passenger image. Therefore, when the passenger detector 32 does not detect a passenger, moving images based on the passenger image may not be displayed on the display device 50.

The image processor 38 may change the display mode of the passenger image generated in accordance with the safety level determined by the safety determiner 35. When the safety is determined to be relatively high (e.g., when the safety is "level 1"), a passenger image is generated so that moving images based on the passenger image are displayed continuously on the display device 50. Meanwhile, when the safety is determined to be relatively low (e.g., when the safety is "level 2"), a passenger image is generated so that the display time (duration of display) of moving images based on the passenger image is limited. For example, a display period, during which the passenger image is displayed, and a non-display period, during which the passenger image is not displayed, are alternated every certain period of time (every one second, two seconds, etc.) so that the passenger image is not displayed continuously. In this way, the driver is prevented from watching the passenger image over a long period of time (e.g., one second or longer or two second or longer). The image processor 38 may change the display time of the passenger image in accordance with the vehicle speed and reduce the display time of the passenger image as the vehicle speed increases. When the accelerator, brake, handle, etc. of the vehicle is being used, the image processor 38 may prevent the passenger image from being displayed during the manipulation. When it is determined, based on map information, etc., that the vehicle is traveling before an intersection or a curve, the image processor 38 may change the display mode of the passenger image such that the closer the vehicle to the intersection or the curve, the shorter the display time of the passenger image. When the safety is determined to be low (e.g., when the safety is "level 3"), the image processor 38 may not display moving images based on the passenger image or change the display so that the visibility of the passenger is low. In this case, the image processor 38 may generate an alert image instead of the passenger image and cause the display device 50 to display the alert image. Alternatively, the image processor 38 may generate an image in which an alert image is superimposed on the passenger image and cause the display device 50 to display the resultant image. Thus, changing the display mode of the passenger image based on the safety level as determined helps the driver to know how the passenger in the back seat is doing and supports safer driving of the vehicle.

The safety determiner 35 may switch the determination criterion used to determine the safety level depending on whether the passenger image is displayed on the display device 50. The safety determiner 35 may be provided with a plurality of determination criteria. The safety determiner 35 may use a normal first determination criterion when the passenger image is not displayed on the display device 50 and use a second determination criterion different from the first determination criterion when the passenger image is displayed on the display device 50. The second determination criterion is defined so that, given the same event, the safety is determined to be relatively low than according to the first determination criterion. For example, the second determination criterion is determined such that some of the events determined to be "level 1" events when the first determination criterion is used are determined to be "level 2" events instead of "level 1" events. In other words, the safety is determined more severely according to the second determination criterion than according to the first determination criterion. When the passenger image is displayed on the display device 50, the attention of the driver is easily directed toward the display device 50. Therefore, by determining the safety level more severely in that situation, the driver can be warned or alerted earlier, or the display mode on the display device 50 can be changed more properly. An eye-gaze tracker for detecting the direction of line of sight of the driver may further be provided. The determination criterion may be switched such that the safety is determined to be relatively low when the driver is detected to be watching the passenger image.

Figure 4:
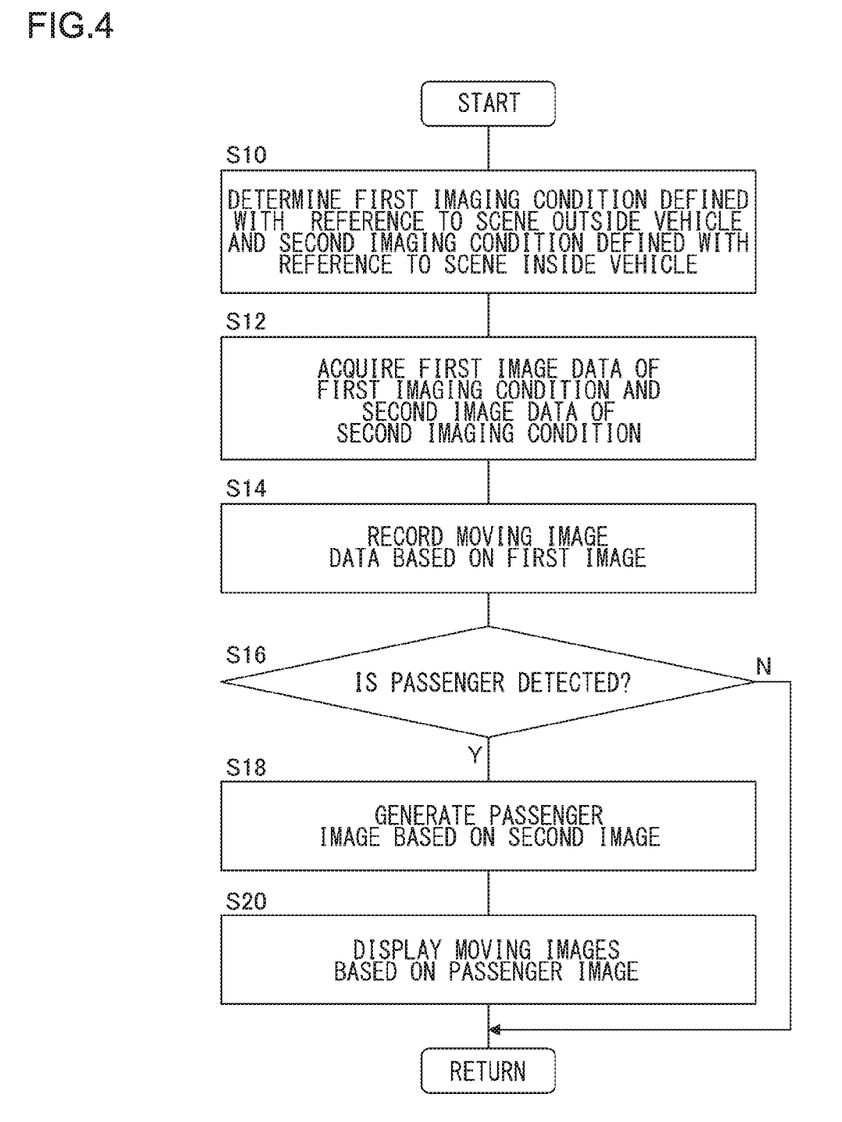
FIG. 4 is a flowchart showing a flow of the display control method.

FIG. 4 is a flowchart showing a flow of the display control method. The imaging condition determiner 34 determines the first imaging condition related to at least one of exposure and color of the camera 42 with reference to the scene outside the vehicle and determines the second imaging condition related to at least one of exposure of the and color camera 42 with reference to the scene inside the vehicle (S10). The imaging controller 14 causes the camera 42 to capture the first image, in which the first imaging condition is used, and the second image, in which the second imaging condition is used, in temporally different frames, and the image acquisition interface 22 captures the first image data and the second image data (S12). The image recorder 30 causes the recorder 54 to record moving image data based on the first image (S14). When the passenger detector 32 detects a passenger (Y in S16), the image processor 38 generates, based on the second image, a passenger image in which the visibility of an image portion including the passenger is higher than in the second image (S18). The display controller 26 causes the display device 50 to display moving images based on the passenger image thus generated (S20). When the passenger detector 32 does not detect a passenger (N in S16), the steps S18 and S20 are skipped.

According to this embodiment, the first image in which the visibility of the scene outside the vehicle is high and the second image in which the visibility of the scene inside the vehicle is high can be collectively captured by using a single camera. Also, by generating and displaying the passenger image based on the second image when a passenger is detected, an image suitable for monitoring a passenger can be provided. According to this embodiment, both the drive recorder function and the monitoring function can be provided at a lower cost than when a camera dedicated for imaging the vehicle interior or a passenger is provided.

According to this embodiment, the driver is prevented from watching the passenger image for a prolonged period of time in a situation in which the safety is determined to be relatively low, by changing the display mode of the passenger image in accordance with the level determined by the safety determiner. Further, by switching the safety determination criterion when the passenger image is displayed, it is possible to call for attention to vehicle driving more properly in a situation in which the driver watches the passenger image.

The present invention has been described above with reference to the embodiment but is not limited to the embodiment. Appropriate combinations or replacements of the features of the illustrated examples are also encompassed by the present invention.

In the embodiment described above, the method of capturing scenes both outside and inside the vehicle by using a single camera is shown. In one variation, the aforementioned process may be applied to properly image each of a plurality of arbitrarily defined image areas included in the image data captured by a single camera. In this case, the camera mounted to the vehicle may capture only an image of the scene outside the vehicle, only an image of the scene inside the vehicle, or both an image of the scene outside the vehicle and an image of the scene inside the vehicle.

The imaging condition determiner may determine an individual imaging condition related to at least one of exposure, color, and brightness of the camera for each of a plurality of arbitrarily defined image areas included in the image data acquired by the image acquisition interface. For example, the imaging condition determiner may determine the first imaging condition for the first image area in the image data and determine the second imaging condition for the second image area different from the first image area. The imaging condition determiner may determine three or more imaging conditions. For example, the imaging condition determiner may determine the third imaging condition for the third image area different from the first image area or the second image area in the image data and may determine the fourth imaging condition for the fourth image area different from the first image area, the second image area, or the third image area in the image data. In other words, the imaging condition determiner may divide one set of image data acquired by the image acquisition interface into n image areas and determine n imaging conditions respectively corresponding to the n image areas. All of the n image areas may be outside the vehicle or inside the vehicle, or some of the image areas may be outside and some may be inside.

The imaging condition determiner may determine an imaging condition defined with reference to the scene outside the vehicle such that an image area excluding an area that captures the road surface that the vehicle travels on or the sky is used is used as a reference. For example, the imaging condition determiner may determine the imaging condition with reference to an area that captures another vehicle, a pedestrian, a building, etc. around the vehicle. The imaging condition determiner may determine an imaging condition defined with reference to the scene inside the vehicle such that an image area that includes a passenger is used as a reference.

The imaging controller may cause the camera to capture images, in which a plurality of imaging conditions determined by the imaging condition determiner are respectively used, in temporally different frames. For example, the imaging controller may cause the camera to capture the first image, in which the first imaging condition is used, and the second image, in which the second imaging condition is used, in temporally different frames. The imaging controller may cause the camera to capture the third image, in which the third imaging condition is used, and the fourth image, in which the fourth imaging condition is used, in frames that are temporally different from those of the first image or the second image. In other words, the imaging controller may cause the camera to capture n images respectively corresponding to n imaging conditions determined by the imaging condition determiner in temporally different frames.

The passenger detector may detect a plurality of passengers. For example, the passenger detector may simultaneously detect a first passenger on the right in the back seat, a second passenger at the center in the back seat, a third passenger on the left in the back seat, and the fourth passenger next to the driver's seat. The image processor may generate passenger images respectively corresponding to the plurality of passengers detected. The image processor may generate, for the plurality of passengers, a plurality of passenger images in which the visibility of an image area including each of the plurality of passengers is high. For example, the image processor may generate the first passenger image in which the visibility of the first passenger is high, the second passenger image in which the visibility of the second passenger is high, the third passenger image in which the visibility of the third passenger is high, and the fourth passenger image in which the visibility of the fourth passenger is high. The imaging conditions of the images used to generate the passenger images may differ from each other. The image used may be an image captured by using an imaging condition optimized for the image area including the associated passenger. The first passenger image may be generated based on the second image in which the imaging condition (e.g., the second imaging condition) defined with reference to the image area including the first passenger is used, and the second passenger image may be generated based on the third image in which the imaging condition (e.g., the third imaging condition) defined with reference to the image area including the second passenger is sued.

When a plurality of passengers are detected, the display controller may cause the display device to display moving images based on a plurality of passenger images respectively corresponding to the plurality of passengers. When two passengers, namely, the first passenger and the second passenger, are detected, for example, the display controller may cause the display device to display the first moving images based on the first passenger image and the second moving images based on the second passenger image. The first moving images and the second moving images may be simultaneously displayed in different areas on the display device or may be displayed separately on the display device according to different timing schedules. In the latter case, a period during which the first moving images are displayed and a period during which the second moving images are displayed may be alternated. For example, the passenger displayed may be switched every five seconds.

According to this variation, each of a plurality of arbitrarily defined image areas can be imaged in a suitable imaging condition by using a single camera. For example, images suitable for recording in the drive recorder may be captured by using the first imaging condition defined with reference to the scene outside the vehicle, and, at the same time, images suitable for monitoring a plurality of passengers in the vehicle can be captured by using the second imaging condition and the third imaging conditions defined with reference to the plurality of passengers.

According to the present invention, the passenger can be suitably captured in an image by using the camera of the drive recorder.

It should be understood that the invention is not limited to the above-described embodiment but may be modified into various forms on the basis of the spirit of the invention. Additionally, the modifications are included in the scope of the invention.

What is claimed is:

1. A drive recorder comprising:
   an image acquisition interface that acquires image data captured by a camera mounted to a vehicle;
   an imaging condition determiner that determines a first imaging condition related to at least one of exposure, color, and brightness of the camera with reference to a first image area in the image data acquired by the image acquisition interface and determines a second imaging condition related to at least one of exposure, color, and brightness of the camera with reference to a second image area different from the first image area in the image data acquired by the image acquisition interface;
   an imaging controller that causes the camera to capture a first image, in which the first imaging condition is used, and a second image, in which the second imaging condition is used, in temporally different frames;
   an image recorder that records moving image data based on the first image;
   a passenger detector that detects a passenger in the vehicle;
   an image processor that generates, based on the second image including the passenger detected by the passenger detector, a passenger image in which visibility of an image area including the passenger is higher than in the second image; and
   a display controller that causes the display device to display moving images based on the passenger image.

2. The drive recorder according to claim 1, wherein
   the imaging condition determiner further determines a third imaging condition related to at least one of exposure, color, and brightness of the camera with reference to a third image area in the image data acquired by the image acquisition interface different from the first image area or the second image area,
   the imaging controller causes the camera to capture a third image, in which the third imaging condition is used, in a frame temporally different from those of the first image or the second image,
   the image processor generates, based on the third image including a further passenger detected by the passenger detector and different from the passenger, a further passenger image in which visibility of an image area including the further passenger is higher than in the third image, and
   the display controller causes the display device to display moving images based on the passenger image and moving images based on the further passenger image.

3. The drive recorder according to claim 1, wherein
   the passenger detector further detects a seating position of the passenger, and
   the imaging condition determiner determines the second imaging condition with reference to the seating position of the passenger detected by the passenger detector.

4. The drive recorder according to claim 1, further comprising:
   a vehicle information acquisition interface that acquires at least one of information related to the vehicle and information related to a situation around the vehicle; and
   a safety determiner that determines a level of safety of vehicle driving based on the information acquired by the vehicle information acquisition interface, wherein
   the image processor changes a display mode of the generated passenger image based on the level of safety determined by the safety determiner.

5. The drive recorder according to claim 1, further comprising:
   a vehicle information acquisition interface that acquires at least one of information related to the vehicle and information related to a situation around the vehicle;
   a safety determiner that determines a level of safety of vehicle driving based on the information acquired by the vehicle information acquisition interface; and
   an announcement determiner that determines an announcement for calling for attention to vehicle driving in accordance with the level of safety determined by the safety determiner, wherein
   when the moving images based on the passenger image are displayed on the display device, the safety determiner determines the level of safety by using a determination criterion different from a criterion used when the moving images are not displayed.

6. The drive recorder according to claim 5, wherein when the announcement is determined by the announcement determiner, the image processor generates a passenger image in which an announcement image indicating the announcement is superimposed, and
the display controller causes the display device to display the moving images based on the passenger image in which the announcement image is superimposed.

7. A display control method comprising:
acquiring image data captured by a camera mounted to a vehicle;
determining a first imaging condition related to at least one of exposure, color, and brightness of the camera with reference to a first image area in the image data acquired and determining a second imaging condition related to at least one of exposure, color, and brightness of the camera with reference to a second image area different from the first image area in the image data acquired;
causing the camera to capture a first image, in which the first imaging condition is used, and a second image, in which the second imaging condition is used, in temporally different frames;
recording moving image data based on the first image;
detecting a passenger in the vehicle;
generating, based on the second image including the passenger detected, a passenger image in which visibility of an image portion including the passenger is higher than in the second image; and
causing the display device to display moving images based on the passenger image.

8. A program comprising computer-implemented modules including:
a module that acquires image data captured by a camera mounted to a vehicle;
a module that determines a first imaging condition related to at least one of exposure, color, and brightness of the camera with reference to a first image area in the image data acquired and determines a second imaging condition related to at least one of exposure, color, and brightness of the camera with reference to a second image area different from the first image area in the image data acquired;
a module that causes the camera to capture a first image, in which the first imaging condition is used, and a second image, in which the second imaging condition is used, in temporally different frames;
a module that records moving image data based on the first image;
a module that detects a passenger in the vehicle;
a module that generates, based on the second image including the passenger detected, a passenger image in which visibility of an image portion including the passenger is higher than in the second image; and
a module that causes the display device to display moving images based on the passenger image.

* * * * *